May 1, 1951 H. A. TURNER 2,551,475
CROSS-ROW BLOCKER AND CHOPPER
Filed Aug. 12, 1947 2 Sheets-Sheet 1
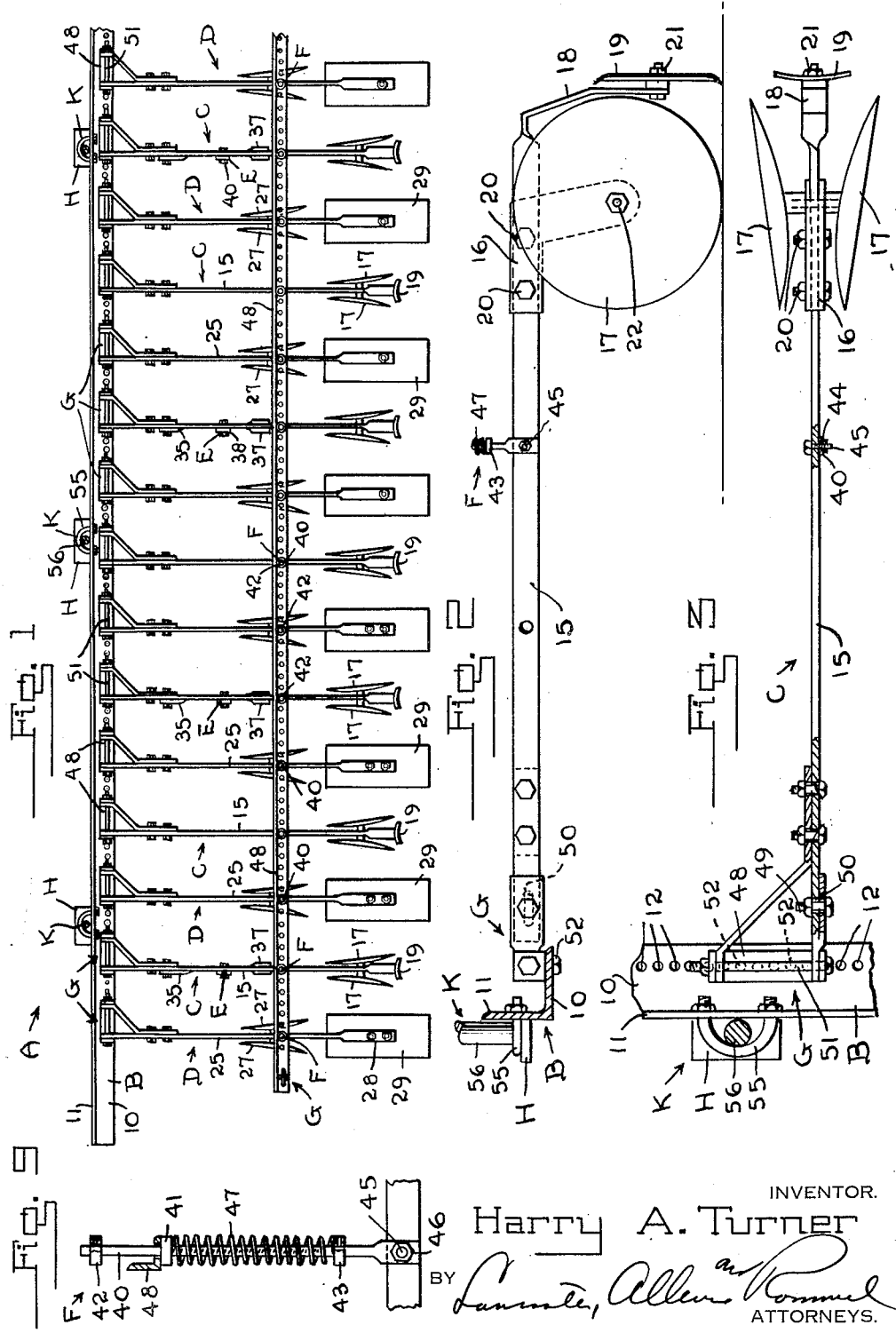
INVENTOR.
Harry A. Turner
BY
ATTORNEYS.

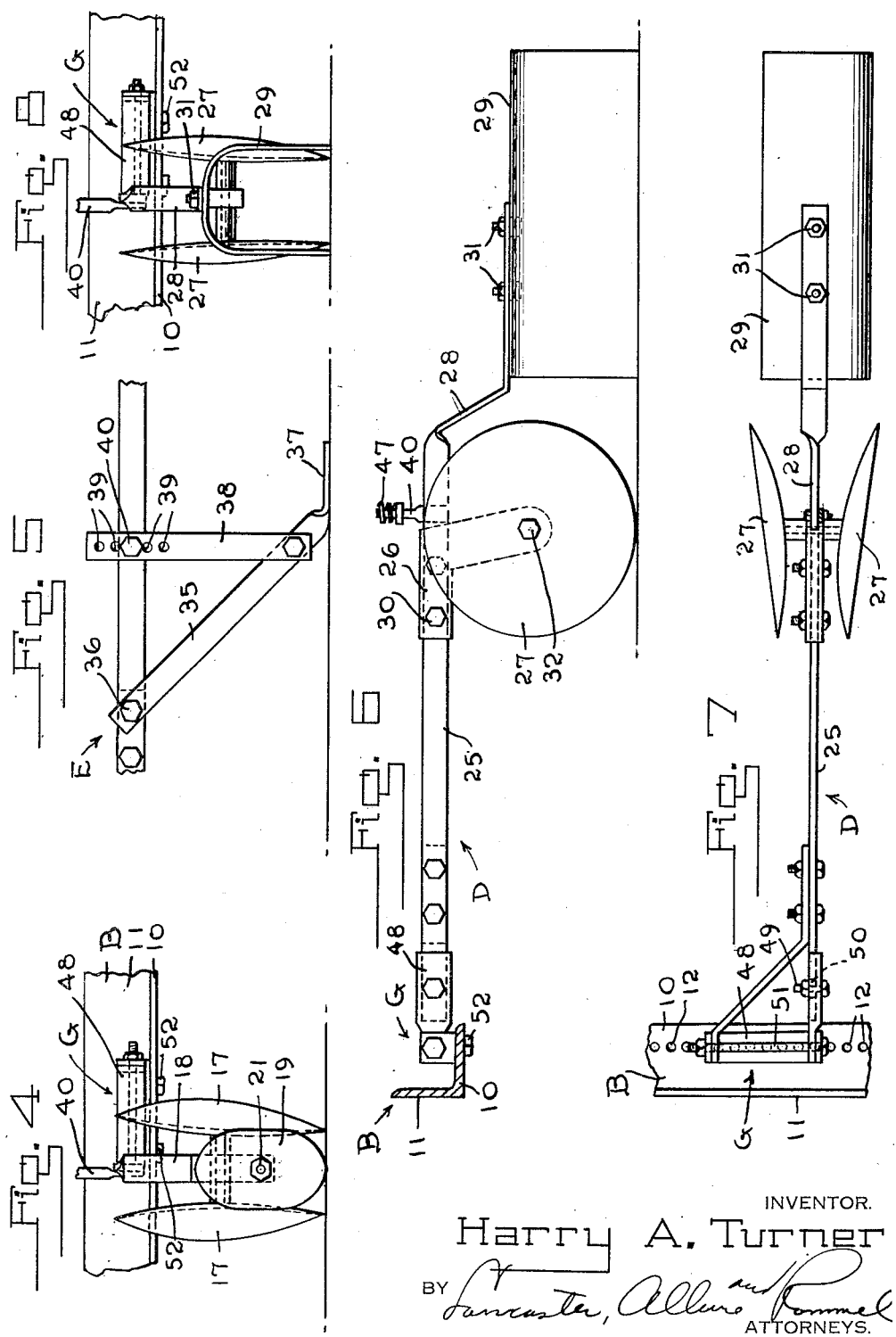

Patented May 1, 1951

2,551,475

UNITED STATES PATENT OFFICE 2,551,475

CROSS-ROW BLOCKER AND CHOPPER

Harry A. Turner, Ferriday, La.

Application August 12, 1947, Serial No. 768,182

1 Claim. (Cl. 97—23)

This invention relates to agricultural apparatus and more specifically to cross-row blockers and choppers. The apparatus is applicable, for example, for use as a cross-row cotton plant blocker or chopper.

An important object of the invention is to provide a blocker and chopper which may be readily attached to a suitable vehicle, as a conventional cultivator and employed to efficiently block out rows of plants, with the soil between the plants clean.

Another important object is to provide a blocker and chopper which may be easily adjusted to the required depth of the work to be done.

Still another major object is to provide a blocker and chopper, including gauge shoes and discs, the former being adjustable as to depth and the latter adjustable as to set.

Yet another object is to provide a cultivator-attachable blocker and chopper which may be raised and lowered, as a unit, from the driver's seat of the cultivator.

Another object is to provide a blocker and chopper which is, in some respects, an improvement upon the cross-row cotton chopper disclosed in my United States Patent No. 1,642,277, granted September 13, 1927.

Other objects and advantages of the invention will be apparent during the course of the following detailed description of the invention, taken in connection with the accompanying drawings, forming a part of this disclosure, and in which drawings:

Figure 1 is a top plan view of the novel apparatus.

Figure 2 is a side elevation of one form of disc assembly employed.

Figure 3 is a top plan of the assembly of Fig. 2.

Figure 4 is an end elevation thereof.

Figure 5 is a side elevation of an adjustable shoe which may be associated with the disc assembly of Figures 2 to 4, inclusive.

Figure 6 is a side elevation of a second form of disc assembly, forming a portion of the new apparatus of Fig. 1.

Figure 7 is a top plan of the disc assembly of Fig. 6.

Figure 8 is a trailing end elevation of the assembly of Figs. 6 and 7.

Figure 9 is an elevation of a combined lift and pressure means associated with the disc assemblies mentioned.

In the drawings, wherein for the purpose of illustration is shown a preferred embodiment of the invention and wherein similar reference characters designate corresponding parts throughout the several views, the novel apparatus is designated generally as A, and comprises a support B for a plurality of spaced-apart disc assemblies C and D, adjustable shoes E, combined lift and pressure means F associated with the disc assemblies C and D, and means G to aid in raising and lowering the disc assemblies C and D, shoes E and means F, as a unit, from a suitable vehicle H, to which the novel apparatus A is attached as by the means K.

The support B is, preferably, an elongated, horizontally-disposed length of angle iron, providing a horizontal section 10 and vertical section 11. The former may be provided with a plurality of spaced-apart, screw shank-receiving, screw-threaded openings 12, as shown in Fig. 3, which, preferably, extend from end to end of the support B.

From Figures 2, 3 and 4, it may be seen that each disc assembly C includes a bar portion or member 15 supporting a depending bracket 16 carrying a pair of chopping structures, which may be discs 17 adjacent one end of the member 15. The extremity of this end may extend downwardly, providing a bracket 18 for a combined cutter and deflector 19 which may be somewhat oval, as in Fig. 4, and positioned to be disposed crosswise the cut made by the associated discs 17. The bracket 16 may be detachably secured to the member 15 as by bolts and nut means 20, the deflector 19 detachably secured to the bracket 18 as by bolt and nut means 21, and the pairs of discs 17 detachably secured to the bracket 16 as by bolt and nut means 22.

Each disc assembly D, as may be seen from Figures 6, 7 and 8, includes a bar portion or member 25, supporting a depending bracket 26 carrying a pair of chopping structures, which may be discs 27 intermediate the ends of the member 25, as may be seen in Figure 1. One end section of the member 25 may form a depending bracket 28 for a guard member 29 which may be somewhat inverted U-shaped, as shown in Fig. 8 and positioned to be disposed longitudinally of the cut made by the associated discs 27. The bracket 26 may be detachably secured to the member 25, as by bolt and nut means 30, the guard member 29 detachably secured to the bracket 28 as by bolt and nut means 31 and the discs 27 detachably secured to the bracket 26 as by bolt and nut means 32.

The adjustable shoe E of Fig. 5 includes an arm portion 35 pivotally carried by the bar portions 15 and 25 (and forming acute angles therewith), as by the nut and bolt assembly 36, with the bolt shank thereof functioning as a pivot. At the lower end of each arm portion 35 is a horizontally-disposed shoe portion 37. Connected with the arm portion 35 is a brace 38 extending upwardly to the bar portion 15 or 25 (as the case may be) and provided with a plurality of spaced-apart perforations 39, any one of which may accommodate the shank of a bolt 40 which extends through a suitable opening in the bar portion forwardly of the discs and is provided with a suitable nut.

Associated with, preferably, each disc assembly C and D is a combined lift and pressure means F, shown more particularly in Fig. 9. This means includes a reciprocating member which may be a rod 40, provided intermediate its ends with a freely sliding abutment 41 which may be a collar and also provided with a pair of adjustable abutments or stops 42 and 43 which may be collars, slidable along the rod 40 but held in adjusted positions as by set-screws carried by the abutments 42 and 43 and bearing against the rod 40. The lower end portion of the rod 40 may be flattened and provided with a perforation 44 to accommodate the shank of a bolt 45 which also extends through a perforation in the associated bar portion or member 15 or 25, as the case may be, of the assemblies C and D, and functions as a pivot means. The bolt 45 carries a suitable nut 46. Extending about the intermediate portion of the rod 40 from the lowermost abutment 43 is an expansion coil spring 47 which extends upwardly to the sliding collar 41 urging the rod downwardly as the sliding collar encounters a stop member. The latter may be a horizontally-disposed section of angle iron 48 forming not only a stop, but also a means to which the means G, to be described, may be secured. This angle iron 48 substantially parallels the length of angle-iron which provides the support B, but it's disposed above the horizontal plane of the latter and to one side of the vertical plane of the latter, that is, rearwardly of the support B. Normally, the sliding abutment 41 bears against the under side of the angle iron section 48 while the adjustable abutment 42 is spaced from the upper surface of this section 48. Tension of the spring 47 may be varied by adjustment of the adjustable abutment 43. It is now clear that, with the angle-iron section 48, which is substantially as long as the angle iron support B, quite heavy, its weight and the tension of the spring 47 will force the bar portions or members 15 and 25 downwardly.

The movement, in unison, of the bar portions 15 and 25 is limited by a portion of the means G, being a pivotal connection between these bar portions and the angle iron support B. Attached to the end section of each bar portion 15 opposite its deflector-carrying end section, and attached to the end section of each bar portion 25 opposite its guard-carrying end section, is a hinge member 48 with one leaf thereof adjustably secured to the bar 15 or 25, as the case may be, by a bolt shank 49 extending through a slot 50 in the bar portions 15 and 25 and through a suitable perforation in the hinge leaf. The latter may be pivotally supported by a pintle 51 carried by a leaf secured to the horizontal section 10 as by a pair of spaced-apart screws 52 adapted to extend into any two closely adajacent openings 12. Thus, if desired the spacing apart of the various disc assemblies C and D, may be adjusted to suit the spacing apart by plant rows. Of course, normally, a disc assembly C alternates with an assembly D, as in Figure 1.

The means G also includes a suitable hoist or pick-up line 53 secured to the angle iron 48 at, preferably, its ends and extending toward the driver's seat (not shown) of the vehicle H, which may be a conventional wheeled cultivator. Pulling in on this line 53 will raise the entire assemblies C, D, E and F off the ground and, of course, letting out on the line 53 will lower these assemblies until the shoe portions 37 come to rest upon the ground.

The means K to couple the novel apparatus A to the vehicle H, may be a plurality of spaced-apart U-members 55, secured to the vertical section 11 of the support B and extending forwardly therefrom. Removable coupling pins 56 extend through suitable vertically-disposed openings in the vehicle H and through these members 55.

From Figure 1 it will be seen that a pair of discs 17 and a cutter and deflector 19 are disposed in the space between two adjacent guard members 25 with the pair of discs 17 and the cutter and deflector within the planes of the end edges of the guard members 25. The shape and location of the guard members 25 fully protect the hills of cotton plants (or the like) left by the discs, as well as prevent disturbance of the hills themselves, without, however, interfering with the efficiency of the discs 15 and their associated cutters and deflectors 19. Since the guard members 25 extend rearward a distance beyond even the cutters and deflectors 19, soil still in a state of disturbance caused by them and the discs 15, immediately after the passage of the discs 15 and cutters and deflectors 17, will not damage the plants nor disturb their hills.

The combined lift and pressure means F provides a floating arrangement of the disc assemblies C and D as well as a floating arrangement for each individual disc assembly C or D. Thus, an obstruction encountered by one or a pair of discs of disc assembly will permit the discs thereof to ride over the obstruction but will not interfere with the work of the other discs of the assemblies.

Damage to the discs 17 and 27 as well as the cutters and deflectors 19 (as might occur when the apparatus A is lowered too fast by the aid of the means G), is prevented by the cushioning effects of the plurality of coil springs 47.

Various changes in the shape, size and arrangement of parts may be made to the form of invention herein shown and described without departing from the spirit of the invention or the scope of the following claim.

What is claimed is:

In a cotton chopper for attachment to a vehicle, an elongated, horizontal support; means to secure said support to a vehicle; a plurality of spaced-apart disc cutter-supporting members extending transversely of said support and pivotally carried thereby; an elongated stop member substantially paralleling said support and disposed above the horizontal plane thereof, said stop member having a plurality of spaced-apart openings; a reciprocating member slidably carried in selected of said openings and extending outwardly thereof; a stop carried by each reciprocating member below said stop member; a stop carried by each reciprocating member above and normally spaced from said stop member; an expansion coil spring for each reciprocating member, bearing against said stops and exerting upward pressure upon said stop member; a disc cutter carried by each cutter-supporting member; vertically-adjustable shoe assemblies carried by said cutter-supporting members; and means to lower said stop member to a position to float upon said coil springs and to raise said stop member, said last-named means being carried in part by said stop member.

HARRY A. TURNER.

REFERENCES CITED

The following references are of record in the file of this patent:

UNITED STATES PATENTS

| Number | Name | Date |
|---|---|---|
| 245,423 | Weller | Aug. 9, 1881 |
| 612,721 | Hafer | Oct. 18, 1898 |
| 810,110 | Agee | Nov. 21, 1905 |
| 991,961 | Donald | May 9, 1911 |
| 1,144,039 | Johnson | June 22, 1915 |
| 1,642,277 | Turner | Sept. 13, 1927 |

OTHER REFERENCES

Publication, "Cross Blocking Sugar Beets by Machine," U. S. Department of Agriculture Leaflet No. 97, issued Aug. 1933; for sale by Sup't. of Documents, Washington, D. C.